Figure 1:
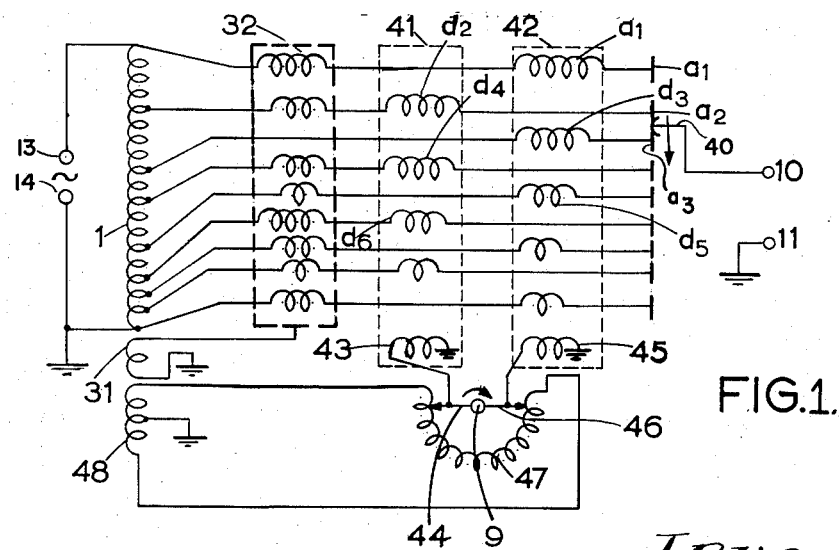

Aug. 13, 1963
R. E. SPENCER ET AL
3,100,864
INTERPOLATING DEVICES, ESPECIALLY FOR THE CONTROL
OF AUTOMATIC MACHINE TOOLS
Filed Jan. 26, 1955
4 Sheets-Sheet 4
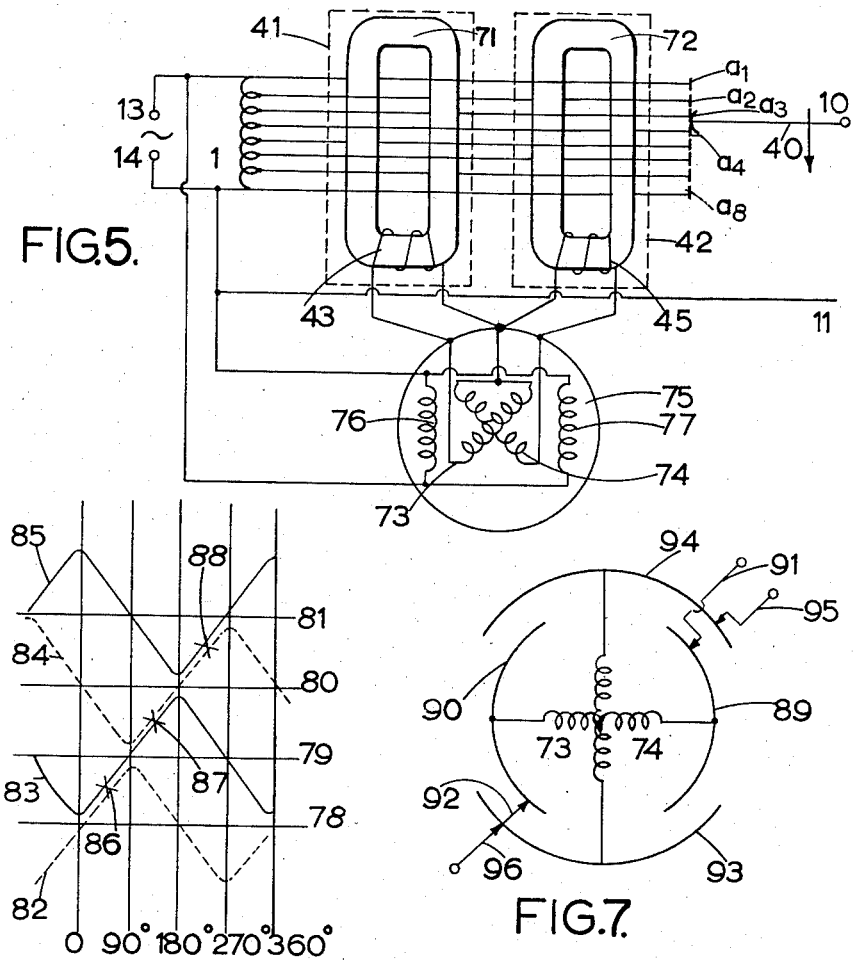
Inventors
R.E. Spencer
G.H. Stephenson United States Patent Office 3,100,864
Patented Aug. 13, 1963

3,100,864
INTERPOLATING DEVICES, ESPECIALLY FOR THE CONTROL OF AUTOMATIC MACHINE TOOLS
Rolf Edmund Spencer, West Ealing, London, and Geoffrey Huson Stephenson, Ealing, London, England, assignors to Electric & Musical Industries Limited, Middlesex, England, a company of Great Britain
Filed Jan. 26, 1955, Ser. No. 484,202
Claims priority, application Great Britain Jan. 27, 1954
14 Claims. (Cl. 323—43.5)

This invention relates to interpolating devices, especially but not exclusively for the control of automatic machine tools.

In automatic machines and in other apparatus it is often necessary to set up a voltage which is an accurate analogue of the value of some function of a variable. For example a signal source may be provided from which voltage signals can be derived representing values of the function at spaced values of the variable, but unless the apparatus is very bulky and complex, the interval between the available function values may be so great that the accuracy is inadequate at intermediate values.

It is of course feasible to effect linear interpolation by connecting a resistance potentiometer between the points which yield the signals between which interpolation is required and by scanning an array of contacts tapped to intermediate points along the potentiometer. The disadvantage of such an arrangement consists by the fact that inaccuracy is imparted if the device is loaded to any appreciable extent, or if more than one similar interpolating devices are connected in cascade. Moreover if very fine sub-division is required, contact resistances may become a significant source of error, and furthermore the output varies in a series of small steps.

The object of the present invention is to provide an improved form of interpolating device with a view to reducing the disadvantages indicated.

A further object of the present invention is to provide an improved form of interpolating device in which difficulties associated with the use of complex mechanical switches are reduced.

A further object of the present invention is to provide an improved form of interpolating device which has a low output impedance.

A further object of the present invention is to provide an improved form of interpolating device with a view to reducing errors due to contact resistances of mechanical switches.

According to the present invention there is provided an interpolating device comprising a signal source having a series of reference points from which alternating voltages can be derived representing values of a function for a series of equi-spaced values of a variable of a function, a series of contacts respectively representing said spaced values of the variable and connected to the respective reference points, a selector movable to derive voltages selectively from said contacts, means for deriving a further voltage variable to represent a variable fraction of the difference between equi-spaced values of the variable, and means for injecting an incremental voltage, responsive to said variable voltage, at a point prior to a selected contact to increment the voltage which would otherwise be derived from said selected contact, to produce interpolation between the function values which can be derived from said reference points.

Figure 2:
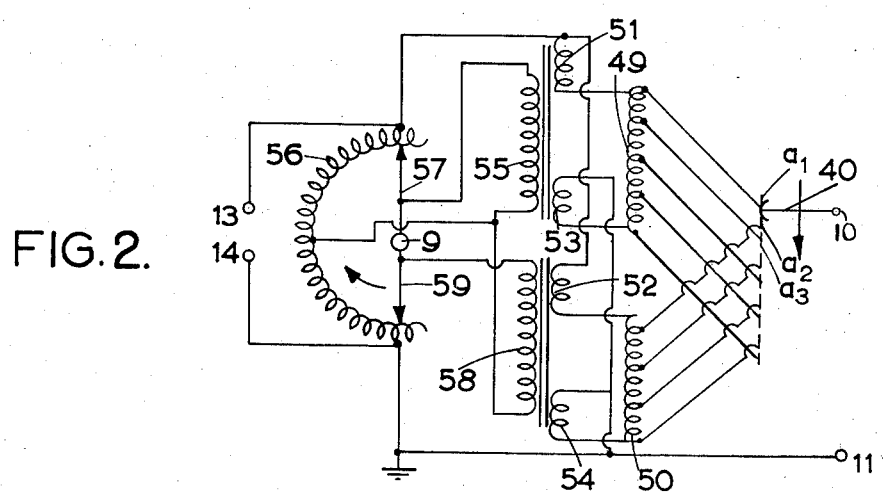
Figure 4:
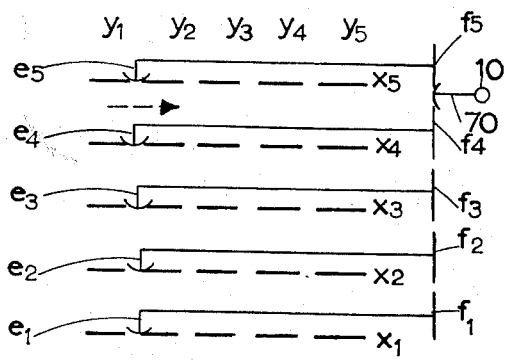
Figure 3:
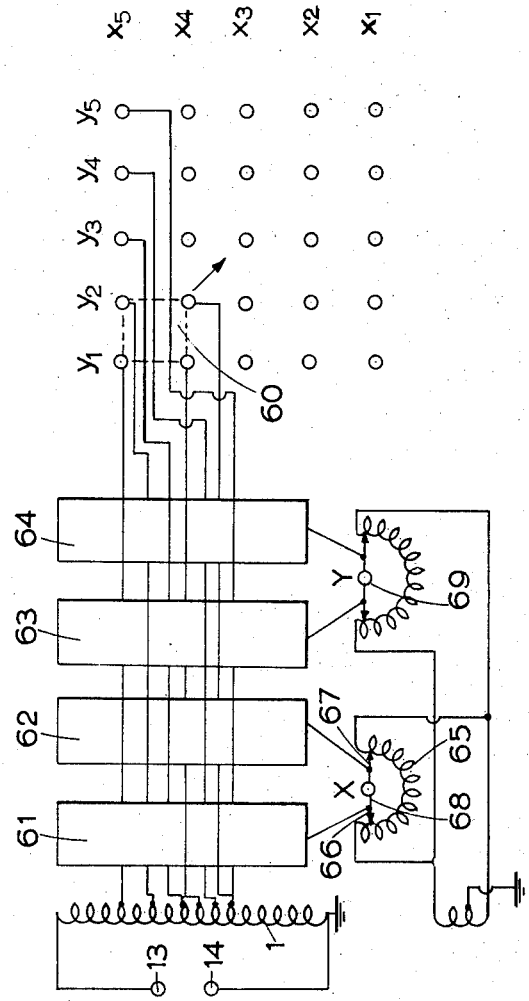

In order that the invention may be clearly understood and readily carried into effect, the invention will now be described with reference to the accompanying drawings, in which:

FIGURE 1 illustrates an example of an interpolating device according to the present invention employing what is termed "pre-switch" interpolation, FIGURE 2 illustrates another device according to the invention employing pre-switch interpolation, FIGURE 3 illustrates a device according to the invention for interpolating between reference values of a function of two variables, FIGURE 4 illustrates a modification of FIGURE 3, FIGURE 5 illustrates a modification of FIGURE 1, FIGURE 6 consists of a graph explanatory of the operation of FIGURE 5, and FIGURE 7 illustrates a variant of FIGURE 5.

Referring to the drawings, the arrangement in FIGURE 1 comprises a tapped auto-transformer 1, which is energised by reference alternating voltage of fixed amplitude, the reference voltage being applied between terminals 13 and 14. The taps on the transformer 1 are connected as shown to an array of contact studs $a_1, a_2, a_3 \ldots a_9$. The studs are arranged to form a circular track although for simplicity of illustration they are shown in the drawing arranged in a straight line. The studs are regularly arranged so that their centre points represent successive equally spaced discrete values of an independent variable. It will be assumed that the arrangement shown in FIGURE 1 is intended for the evaluation of function of this variable and the taps on the auto-transformer 1 to which the studs are connected are so located that the E.M.F.'s at the taps have amplitudes which (within the limits of accuracy determined by the number of turns on the auto-transformer 1) are analogues of the values of the function for the discrete values of the variable represented by the positions of the respective studs. Although the arrangement illustrated in FIGURE 1 performs linear interpolation in the evaluation of the function for any value of the variable, the function is not itself linear and so the taps on the auto-transformer 1 are not equally spaced. The limits of accuracy for the E.M.F.'s at the taps of the auto-transformer 1 arise from the fact that an anto-transformer cannot conveniently be tapped at the fraction of a turn, and to increase the accuracy obtainable in the E.M.F.'s applied to the studs $a_1, a_2, a_3 \ldots$ the electro-motive forces derived from the taps are modified by increments induced across a system of secondary windings $b_1, b_2, b_3 \ldots$. These secondary windings have a common primary winding 30 energised by an alternating voltage of fixed amplitude derived from a winding 31 wound on the same core as the auto-transformer 1. The primary winding 30 and the system of secondary windings $b_1, b_2, b_3 \ldots$ is represented in general by the dotted rectangle 32 and is referred to as an injector since it injects incremental E.M.F.'s into the leads to the studs $a_1, a_2, a_3 \ldots$. The incremental signals are constant since the primary winding 30 is energised by a voltage of fixed amplitude and is arranged to inject electro-motive force equal to fractions of the electro-motive force across one turn of the auto-transformer 1. The auto-transformer 1 and the injector 32 constitute a voltage divider for yielding voltages at a series of reference points, namely the right hand ends of the secondary windings in the injector 32.

The studs $a_1$, $a_2$, $a_3$ . . . form part of a selector switch which has a selector in the form of a brush 40 mounted on a shaft which is rotatable so that the brush can scan the contact track formed by the studs, the angular displacement of the shaft and therefore of the brush 40 from a datum angle representing the instantaneous value of the variable. Moreover, the brush remains in contact with any particular stud $a_1$, $a_2$, $a_3$ . . . through a range of positions corresponding to a range of values of the variable, centred at the discrete value corresponding to the particular stud. In the arrangement being described, the linear interpolation is achieved by causing the E.M.F. which is applied to the particular stud engaged by the brush 40 at the instant under consideration to differ from the value due to the auto-transformer 1 and the injector 32 in dependence upon the displacement of the brush 40 from the mid point of the particular stud. This variation is produced by two injectors 41 and 42. The injector 41 comprises a system of secondary windings $d_2$, $d_4$, $d_6$ . . . connected in series in the leads to the even numbered studs $a$. The number of turns in each of these secondary windings is representative of the differential co-efficient of the function for the discrete value of the variable represented by the respective stud. As represented in the drawing, the arrangement allows for the differential co-efficient to be different for the different discrete values of the variable. Similarly, the injector 42 comprises a system of secondary windings $d_1$, $d_3$, $d_5$ . . . connected to the odd numbered studs $a$. The number of studs in each of the secondary windings $d_1$, $d_3$, $d_5$ . . . is again representative of the magnitude of the differential co-efficient of the function for the appropriate discrete value of the variable.

The injector 41 has a primary winding 43 to which is applied a voltage set up between ground and a brush 44 on a shaft 9 whilst the injector 42 has a primary winding to which is applied the voltage set up between ground and a brush 46 mounted on the shaft 9 displaced 180° from the brush 44. The brushes 44 and 46 scan an auto-transformer 47 energised by a fixed reference voltage derived from a centre tapped winding 48 wound on the same core as the auto-transformer 1. In practice, the scanning of the auto-transformer 47 is achieved by connecting taps on the auto-transformer to studs arranged in an arc covering somewhat more than 180° around the shaft 9. The shaft 9 is geared to the shaft driving the brush 40 so that the shaft 9 makes half a revolution while the shaft carrying the brush 40 undergoes a displacement equal to the distance between the centres of two adjacent studs $a$. The shaft 9 is therefore referred to as the high speed shaft of the arrangement and the other shaft as the slow speed shaft. The brushes 44 and 46 are located on the shaft 9 so that the brush 44 is at the mid point of the auto-transformer 47 each time the brush 40 is at the mid point at one of the even numbered studs $a$, and so that the brush 46 is at the mid point of the auto-transformer 47 each time the brush 40 is at the mid point of one of the odd numbered studs $a$. The number of turns in the winding 48 is proportioned to cause the voltage set up between ground and the brushes 44 and 46 to represent the difference between the instantaneous value of the independent variable, represented by the position of the brush 40, and the discrete value represented by that one of the studs $a_1$, $a_2$, $a_3$ . . . with which the brush 40 is in contact at any particular time. This difference is referred to as the independent increment. Moreover, the effect of the injectors 41 and 42 is to produce E.M.F.'s across the respective secondary windings $d$ each of which represents the product of the independent increment multiplied by the differential co-efficient or "interpolation co-efficient" appropriate to the respective stud to which the E.M.F. is applied. The E.M.F.'s across the secondary windings $d$ are called dependent increments. The components 41 to 43 as a whole can therefore be regarded as a voltage divider of variable division ratio for deriving an incremental voltage which is a variable fraction of the voltage between the reference point selected by the brush 40 and a neighboring reference point, the reference points in this example being as stated the right hand ends of the secondary windings in the injector 32.

It will therefore be appreciated that when the brush 40 on the slow speed shaft engages any of the studs $a_1$, $a_2$, $a_3$ . . . the voltage derived by the brush will represent the discrete value of the function corresponding to the stud to which is added the appropriate dependent increment. The output of the arrangement is derived between terminals 10 and 11, one of which is connected to the brush 8 and the other of which is connected to ground and thus to the supply terminal 14. Moreover, due to the rotation of the shaft 9 carrying brushes 44 and 46, the dependent increment varies in magnitude and sign in accordance with the displacement of the brush 40 through the range of positions in which it remains in contact with any particular one of the studs $a$. The brush 40 is of the make-before-break kind so that no interruption occurs in the output voltage of the arrangement whilst the brush is changing from one stud $a$ to the next. Due to the fact that the studs associated with the auto-transformer 47 form an arc which subtends an angle slightly more than 180°, both the brushes 44 and 46 apply voltage to the primary windings 43 and 45 of the injectors 41 and 42 during the changeover of the brush 40 from one stud to another. Therefore, during periods when the brush 40 engages two studs the signals on both studs are nominally equal and there is virtually no discontinuity in the output. The extent by which the studs of the auto-transformer 47 form an arc subtending an angle more than 180° is such as to cover any period of uncertainty as to the studs $a$ from which the brush 40 is obtaining the output signal.

The arrangement in FIGURE 1 may be said to effect preswitch interpolation inasmuch as the complete interpolation increment, or the dependent increment as it may be referred to, is injected into the leads to the selector switch from which the desired output signal is derived. If the function is a linear function so that the interpolation coefficient is constant, a preferred form of arrangement employing preswitch interpolation is illustrated in FIGURE 2 since it avoids the need for a large number of secondary windings in the injectors. Referring to FIGURE 2, the signals representing the function values applied to the studs $a_1$, $a_2$, $a_3$ . . . are derived alternately from two auto-transformers 49 and 50 which replace the single auto-transformer 1 of FIGURE 1. The upper ends of the auto-transformers 49 and 50 are connected to the supply terminal 13 through secondary windings 51 and 52 respectively while the lower ends of the auto-transformers 49 and 50 are connected to the supply terminal 14 through the secondary windings 53 and 54 respectively. The windings 51 and 53 are inductively coupled to primary winding 55 which is connected between the mid-point of an auto-transformer 56 and a brush 57 which scans the auto-transformer 56. Similarly the windings 52 and 54 are inductively coupled to a primary winding 58 connected between the mid-point of 56 and a second brush 59. The brushes 57 and 59 are mounted, 180° apart, on the high speed shaft 9. The voltage set up on the brushes 57 and 59 represents the independent increment and the circuit is so arranged that the voltage across each of the secondary windings 51, 53, 52, 54 at any instant has an amplitude representing the dependent increment. Therefore the mean voltage of the main auto-transformer (49 or 50) from which the output is being taken at any instant is raised or lowered by an amount representing the required dependent increment so that the voltage between the output contacts 10 and 11 is fully interpolated. The auto-transformer 56 has sufficient overhang to cover any period of uncertainty as to which of the auto-transformers 49 and 50 the output is being taken from.

When the output is derived from both the auto-transformers 49 and 50, the E.M.F.'s set up at the two studs of the series $a_1, a_2, a_3 \ldots$, which are engaged by the brush 40 are nominally equal. The arrangement in FIGURE 2 has the advantage compared with FIGURE 1 that only two secondary windings (51 and 53 for example) are required in place of the system of secondary windings in the injector 41 or 42. These two windings may, moreover, be of much lower series impedance than the many separate windings used in FIGURE 1.

Instead of providing an overhang on the auto-transformer 56 to ensure that both brushes 57 and 59 are on the contact track during the time when the brush 40 changes from one stud to another, the studs $a_1, a_2, a_3 \ldots$ may be arranged in two tracks scanned by separate brushes which in effect leap-frog from one stud to the next and by following up the two brushes with a precision change-over switch operated from the high speed shaft.

FIGURE 3 is similar generally to FIGURE 1 but illustrates the extension of the invention to interpolation of a function of two variables. The studs of the slow speed switch are now arranged in a two dimensional matrix consisting of rows $x_1, x_2, x_3 \ldots$ and columns $y_1, y_2, y_3 \ldots$, the two variables of the function being represented as $x$ and $y$. The stud $y_1x_5$ is connected to a tap in the auto-transformer 1 at which an E.M.F. is set up representing the value of the function when $y=y_1$ and $x=x_5$. The stud $y_2x_5$ has applied to it an E.M.F. representing the value of the function when $y=y_2$ and $x=x_5$. Similarly, the other studs in the row $x_5$ represent values of the function for successive values of $y$, with $x$ remaining at $x_5$. The connection of the studs in the other rows follows a similar pattern. The slow speed brush is represented by the dotted rectangle 60 and it is assumed to be capable of moving in two directions according to the vector sum of $x$ and $y$. Four interpolation injectors 61, 62, 63 and 64 are arranged between the auto-transformer 1 and the stud matrix. The injectors 61 and 62 are energized by the output of an auto-transformer 65 having brushes 66 and 67 driven by one high speed shaft 68 so that the voltages on the brushes have amplitudes representing the independent increment in $x$, while the injectors are arranged to inject voltages representing the product of the independent increment in $x$, and the corresponding interpolation coefficient, namely $$\left(\frac{\partial Z}{\partial x}\right)y$$

where $Z$ is the function being interpolated. Similarly, the injectors 63 and 64 are energized by voltages having amplitudes representing the independent increment in $y$, this increment being represented by a displacement of a high speed shaft 69 and the injectors are arranged to inject voltages representing the product of the independent increment in $y$ and the corresponding interpolation coefficient, namely $$\left(\frac{\partial Z}{\partial y}\right)x$$

The leads to the studs in the row $x_5$ all pass through the injector 61 and pass alternately through the injectors 63 and 64. Similarly, the leads to the studs in the row $x_4$ all pass through the injectors 62 and pass alternately through the injectors 63 and 64, and so on. The brush 60 is of such a size that it may overlap four studs at one time but by virtue of the four injectors arranged in the manner indicated, the voltages which can be derived from any four studs so interconnected are nominally equal. The precise time of the change-over is therefore not important, as in the case of the one dimensional function unit illustrated in FIGURE 1.

Instead of employing a switch having a brush 60 movable in two dimensions, two one dimensional switches connected in cascade may be employed. This is represented in FIGURE 4 in which one slow speed shaft (not shown) rotatable to represent the variable $y$, carries a series of brushes $e_1, e_2, e_3 \ldots$ each brush scanning a row of the contacts. The brushes $e_1, e_2, e_3 \ldots$ are conductively connected to the studs $f_1, f_2, f_3 \ldots$ of the second switch which has a single brush 70 mounted on a slow speed shaft so as to scan the studs $f_1, f_2, f_3 \ldots$, the shaft of the brush 70 being movable to represent the variable $x$.

The arrangement of FIGURE 4 can be extended to include three or more dimensions, so that functions of three or more variables can be evaluated, by using as many switches in cascade as there are variables of the function.

In the arrangements shown in FIGURES 1, 2, 3 and 4 the output is taken directly from a slow speed switch. It must, as aforesaid, be of the make-before-break type and the period when it is in doubt which of two studs are engaged by the slow speed brush should not be so great as to carry the use of any one stud more than 10 or 20 percent beyond the half-way mark between it and its successor. The construction of the auto-transformer of the high speed switch on the other hand is not critical; the only essential is a sufficient overhang beyond 180° to cover the widest range of overlap of the slow speed switch so that the output cannot be taken from any lead until the injectors through which it passes are energized with the independent increments.

Moreover, in all the arrangements so far described the setting up of the independent increment has been achieved by causing a brush to scan a tapped auto-transformer, the effect of the brush being to vary the number of secondary turns on the auto-transformer. The arrangement has, however the disadvantage that the output is granular, that is variable only in small discrete steps and a non-granular output is often desirable since it is not liable to cause adjacent stud oscillation if used to provide the input of a self balancing servo system having a high servo loop gain. Moreover, the studs to which the auto-transformer tappings are connected are subject to wear. For these reasons it is preferable to replace the interpolating auto-transformers by variable linkage transformers, that is by transformers having separate primary and secondary windings so arranged that the output voltage of the secondary winding has a linear relationship relative to displacement between primary and secondary windings. Such a transformer is not a switching device and it cannot be made responsible for determining change-over points on the slow speed switch. Such a variable linkage transformer is therefore most advantageously employed in arrangements such as shown in FIGURES 1 and 2, in which since pre-switch interpolation is employed, the precise change-over time for the high speed device is unimportant provided it has an extended range of linearity so as to cover any period of uncertainty as to the position of the slow speed switch. The required range of linearity for the high speed device is given by $$\theta = \frac{360}{n}(1+\Delta)°$$

where $n$ is the number of studs traversed on the slow speed switch for one revolution of the high speed shaft and $\Delta$ is the increment which is necessary in order to avoid trouble due to the relatively inaccurate switch timing. The number $n$ cannot be less than 2 but in the case of a variable linkage transformer it is preferable to make $n$ greater than 2, $n=4$ being a suitable number. The reason for this is that if $n$ is 2, $\theta$ must be greater than 180° which means that the output of the transformer secondary will need to vary linearly over a range of angular displacements exceeding 180°. This is difficult to achieve and involves the further difficulty that the envelope waveform of the secondary output cannot be symmetrical with respect to any angle of rotation. For these reasons it is preferable to have $n=4$ and to employ a variable linkage transformer having two secondary windings whose magnetic axes are mutually at right angles.

FIGURE 5 illustrates a modification of FIGURE 1 employing an untapped variable linkage transformer. In this figure 71 and 72 represent the magnetic cores of the dependent increment injectors 41 and 42 respectively. The primary windings of these injectors 43 and 45 are connected respectively across secondary windings 73 and 74 of the variable linkage transformer 75, these windings having, as aforesaid, their magnetic axes mutually at right angles. The windings 73 and 74 are mounted to rotate with the high speed shaft not shown, so that their angular displacement represents the independent increment. The transformer 75 has electrically-paralleled primary windings 76 and 77 energised from the supply terminals 13 and 14. It is to be observed, moreover, that alternate secondary windings in the injectors 41 and 42 are wound in opposite senses, each secondary winding being represented in the drawing as a single turn winding produced merely by passing the respective conductor through the injector core. Thus, the lead to the stud $a_1$ passes in one sense through the core 71 whilst the lead to $a_3$ passes in the opposite sense and so on. Similarly the lead to $a_2$ passes in one sense through the core 72 whilst the lead to $a_4$ passes in the opposite sense, and so on.

The operation of the variable linkage transformer in FIGURE 5 is illustrated in FIGURE 6 where the horizontal lines 78, 79, 80 and 81 represent the E.M.F.'s applied by the auto-transformer 1 to four successive studs of the slow speed switch say $a_1$, $a_2$, $a_3$, $a_4$. The vertical lines represent successive displacements of 90° of the secondary windings 73 and 74 from a datum position in which the winding 73 has its magnetic axis at right angles to those of the windings 76 and 77. The dotted curve 82 represents with respect to the base line 78 the amplitude of the E.M.F. injected in the lead to the stud $a_1$ by the injector 41 and is linearly proportional to the amplitude of the voltage set up across the secondary winding 73. The curve 83 represents with respect to the base line 79 the amplitude of the E.M.F. injected into the lead to the stud $a_2$ by the injector 42 and is linearly proportional to the amplitude of the voltage set up across the secondary winding 74. Similarly the curves 84 and 85 represent with respect to the base lines 80 and 81 the amplitudes of the E.M.F.'s injected into the leads to the studs $a_3$ and $a_4$, the curves 84 and 85 being negatives of the curves 82 and 83 since the corresponding injector windings are reversed. As the slow speed brush 40 traverses the stud $a_1$, the voltage derived from it varies along the curve 82 and at the point 86 the brush 40 changes over to the stud $a_2$. The output voltage then varies along the curve 83 to the point 87 when the brush 40 changes to the stud $a_3$. The output then varies according to the curve 84 as far as the point 88 whereafter the output is derived from the stud $a_4$ and so on. It will therefore be apparent that the output voltage of each secondary winding on the variable linkage transformer 75 need only have a linear relationship to the angular displacement over a range of $\pm(45°+\delta)$ about each position giving zero output, the increment $\delta$ being that required to cover any uncertainty as to the time of changeover of the brush 40 from one slow speed switch stud to its successor. In practice a linear range of the order of $\pm 60°$ gives an adequate overhang.

The variable linkage transformer may be of any suitable construction which yields a desirably low output impedance and a preferred construction is described in the specification of United States Patent No. 3,882,483.

In the arrangement shown in FIGURE 5 it is assumed that the output from the secondary windings 73 and 74 is derived from three slip rings. Instead of reversing the sense of alternate secondary windings in the injectors, the outputs of the secondary windings 73 and 74 may be derived from two commutators (as shown in FIGURE 7) one of which comprises contact arcs 89 and 90 and brushes 91 and 92 and the other of which comprises contact arcs 93 and 94 and brushes 95 and 96. The primary winding 43 of the injector 41 is connected between the brushes 95 and 96 whilst the primary winding 45 of injector 42 is connected between the brushes 91 and 92.

In all the examples illustrated the reference voltage is shown applied between the ends of the main auto-transformer. The reference voltage may however be applied to tappings on the auto-transformer, which need not be fixed.

Moreover, it has been assumed that when the brush from which the output is derived is bridging two contact studs, the E.M.F.'s set up at the contacts are at least nominally equal. In practice the reference points may however be selected in such a way that a slight discontinuity exists between the E.M.F.'s involved, which implies that the brush will short-circuit a section of the auto-transformer, unless precautions are taken toward this. Such precaution may consist of inserting resistances in the leads to the contact studs, or inserting inductances in the leads wound on a common core, the inductances in alternate leads being oppositely wound. The impedance of such inductances may be increased by having a secondary winding on the core, connected across a load resistance.

What we claim is:

1. An interpolating device comprising a signal source having a series of reference points from which alternating voltages can be derived representing values of a function for a series of equi-spaced values of a variable of said function, a series of contacts respectively representing said spaced values of the variable and connected to the respective reference points, a selector movable to derive voltage selectively from said contacts, means for deriving a further voltage variable in proportion to a variable fraction of the difference between equi-spaced values of the variable, and means for injecting an incremental voltage, responsive to said variable voltage, at a point prior to a selected contact to increment the voltage derived from said selected contact, to produce interpolation between the function values which can be derived from said reference points.

2. A device according to claim 1, said injecting means comprising means for deriving a voltage which is large compared with said incremental voltage, and means for stepping down said large voltage to derive said incremental voltage.

3. A device according to claim 1 comprising a conductor leading from each reference point to the corresponding contact, and said injecting means comprising means for injecting said incremental voltage selectively into said conductors.

4. An interpolating device comprising a signal source having a series of reference points for which alternating voltages can be derived representing values of a function for a series of discrete values of a variable of the function, selector means movable to select among said reference points, means responsive to movement of said selector means from one reference point to another for deriving an incremental voltage which is a fraction, variable with said movement, of the voltage between the respective reference points, and means for injecting said incremental voltage to said signal source to vary the mean voltage of said signal source thereby to combine said incremental voltage with voltage at a reference point selected by said selector means.

5. A device according to claim 4 said signal source comprising two auto-transformers, a series of contacts with alternate contacts connected to reference points on one of said auto-transformers and intervening contacts connected to reference points on the other auto-transformer, a brush constituting said selector means movable to scan said contacts and said injector means being operative to vary the mean voltage of said auto-transformers alternately.

6. An interpolating device comprising an auto-transformer, a source of reference voltage having a pair of output terminals connected respectively to the ends of said auto-transformer, a series of equi-spaced taps on said auto-transformer, a series of contacts connected respectively to said taps, a further transformer having primary turns connected at its ends respectively to said output terminals, means for deriving voltage from secondary turns of said further transformer, a selector for deriving voltage selectively from said contacts, and means for stepping down voltage derived from said secondary turns and injecting the stepped down voltage into the connection to a selected contact from the respective tap on said auto-transformer, and means for varying the transformation ratio between said primary and secondary turns of said further transformer, the step down of voltage derived from secondary turns being predetermined to produce, in response to variation of said transformation ratio, interpolation between voltages which can be derived from said taps.

7. A device according to claim 6, said further transformer having said primary turns and secondary turns mounted for relative rotation to produce variation of the transformation ratio of said transformer.

8. An interpolating device for setting up a voltage which is a function of a variable comprising a first voltage divider having a series of taps located to yield voltages which respectively represent values of the function at a series of equi-spaced values of said variable, a series of equi-spaced contacts respectively representing said values of the variable, a selector which can be moved to make contact successively with said contacts, said selector being such that before breaking contact with any one particular contact, it makes contact with the next succeeding contact, two injecting transformers, conductive connections from said taps to the respective contacts, the conductive connections to the even numbered contacts including secondary windings of one of said injecting transformers and the conductive connections to the odd numbered contacts including secondary windings of the second injecting transformer, first means mechanically coupled to said selector to provide a first incremental voltage which varies linearly with movement of said selector at least from just prior to disengagement of said selector from each odd numbered contact to just after engagement of said selector with the next odd numbered contact, said first incremental voltage being zero when said selector is substantially centrally aligned with an even numbered contact, second means mechanically coupled to said selector to provide a second incremental voltage which varies linearly with movement of said selector at least from just prior to disengagement of said selector from each even numbered contact to just after engagement of said selector with the next even numbered contact, said second incremental voltage being zero when the selector is substantially centrally aligned with an odd numbered contact, a primary winding of said first injecting transformer connected to receive said first incremental voltage, and a primary winding of said second injecting transformer connected to receive said second incremental voltage, the magnitudes and senses of the coupling ratios between the primary and secondary windings of said injecting transformers being predetermined to produce substantially equal voltages at two next adjacent contacts while said selector is in the process of moving from one of said next adjacent contacts to the other.

9. An interpolating device according to claim 8, wherein said first means mechanically coupled to said selector and said second means mechanically coupled to said selector comprise a common auto-transformer having a first movable selector for providing said first incremental voltage and a second movable selector for providing said second incremental voltage.

10. An interpolating device according to claim 9, wherein said voltage divider comprises an auto-transformer, said device further comprising a voltage source having its output terminals connected to the terminals of said auto-transformer, said last mentioned auto-transformer and said common auto-transformer being inductively coupled.

11. An interpolating device according to claim 8, wherein said first means mechanically coupled to said selector and said second means mechanically coupled to said selector comprise a common transformer having a primary winding and having two secondary windings arranged in space quadrature relationship and coupled to said selector for rotation relative to said primary winding, one of said secondary windings providing said first incremental voltage and the other of said first incremental voltage and the other of said secondary windings providing said second incremental voltage.

12. An interpolating device according to claim 11, wherein said voltage divider comprises an auto-transformer and further comprising a voltage source having output terminals connected to the terminals of said auto-transformer and to the terminals of the primary winding of said common transformer.

13. An interpolating device for setting up a voltage which is a function of a variable comprising a first voltage divider having a series of taps located to yield voltages which respectively represent values of the function at a series of equi-spaced values of said variable, a second voltage divider having a series of taps located to yield voltages which respectively represent values of the same function at another series of equi-spaced values of said variable which lie respectively midway between said first mentioned equi-spaced values of said variable, a series of equi-spaced contacts, the odd numbered contacts being connected to the respective taps on said first mentioned voltage divider and the even numbered contacts being connected respectively to the taps on said second voltage divider, a source of reference voltage having two output terminals, first and second injecting transformers, corresponding respectively to said first and second voltage dividers, each of said injecting transformers having two secondary windings, one secondary winding of each injecting transformer being connected from one terminal of the respective voltage divider to one terminal of said voltage source, and the other secondary winding of each injecting transformer being connected from the other terminal of the respective voltage divider to the other terminal of said voltage source, a selector which can be moved to make contact successively with said contacts, said selector being such that before breaking contact with any one particular contact it makes contact with the next succeeding contact, first means mechanically coupled to said selector to provide a first incremental voltage which varies linearly with movement of said selector at least from just prior to disengagement of said selector from each even numbered contact to just after engagement of said selector with the next even numbered contact, said first incremental voltage being zero when said selector is substantially centrally aligned with an odd numbered contact, second means mechanically coupled to said selector to provide a second incremental voltage which varies linearly with movement of said selector at least from just prior to disengagement of said selector from each odd numbered contact to just after engagement of said selector with the next odd numbered contact, said second incremental voltage being zero when the selector is substantially centrally aligned with an even numbered contact, a primary winding of said first injecting transformer connected to receive said first incremental voltage, and a primary winding of said second injecting transformer connected to receive said second incremental voltage, the magnitudes and senses of the coupling ratios between the primary and secondary windings of said injecting transformers being predetermined to produce substantially equal voltages at two next adjacent contacts while said selector is in the process of moving from one of said next adjacent contacts to the other.

14. An interpolating device according to claim 13 wherein said first means mechanically coupled to said selector and said second means mechanically coupled to said selector comprise a common transformer having primary turns connected from one terminal of said voltage source to the other, said injecting transformers being voltage step-down transformers.

References Cited in the file of this patent

UNITED STATES PATENTS

| | | |
|---|---|---|
| 2,572,545 | Walker | Oct. 23, 1951 |
| 2,727,205 | Annis | Dec. 13, 1955 |
| 2,774,934 | Gitzendanner | Dec. 18, 1956 |
| 2,781,967 | Spencer et al. | Feb. 19, 1957 |
| 2,864,555 | Spencer et al. | Dec. 16, 1958 |

OTHER REFERENCES

Electronic Analog Computers (Korn and Korn), 1952, pp. 254 and 255.

Electronic Analog Computers (Korn and Korn), 1952, pp. 256, 284 and 285 (other parts of this reference have been previously cited).